(12) United States Patent
Wang

(10) Patent No.: US 11,144,991 B2
(45) Date of Patent: Oct. 12, 2021

(54) COGNITIVE ASSESSMENT SYSTEM

(71) Applicant: Zinan Wang, Liaoning (CN)

(72) Inventor: Zinan Wang, Liaoning (CN)

(*) Notice: Subject to any disclaimer, the term of this patent is extended or adjusted under 35 U.S.C. 154(b) by 284 days.

(21) Appl. No.: 16/417,629

(22) Filed: May 20, 2019

(65) Prior Publication Data

US 2020/0320618 A1 Oct. 8, 2020

(30) Foreign Application Priority Data

Apr. 2, 2019 (CN) .......................... 201910263403.8

(51) Int. Cl.
*G06Q 40/02* (2012.01)
*G06F 3/01* (2006.01)
*G06T 19/00* (2011.01)
*H04W 4/02* (2018.01)

(52) U.S. Cl.
CPC .......... *G06Q 40/025* (2013.01); *G06F 3/011* (2013.01); *G06T 19/00* (2013.01); *H04W 4/025* (2013.01); *G06T 2219/024* (2013.01); *G06T 2219/2012* (2013.01)

(58) Field of Classification Search
CPC ...... G06Q 40/025; G06Q 40/02; G06T 19/00; G06T 2219/024; G06T 2219/2012; G06T 7/70; G06T 7/11; H04W 4/025; H04W 4/00; H04W 4/02; H04W 4/80; G06F 3/01; G06F 3/011; G06F 3/015; G06F 2203/011; G06F 21/554; G06F 21/577; H04L 63/1433; H04L 63/1416; H04L 63/08; H04L 67/16; H04L 63/0263; G06K 9/00671; G06K 9/6267
See application file for complete search history.

(56) References Cited

U.S. PATENT DOCUMENTS

2018/0150892 A1* 5/2018 Waldron ............... H04L 67/306
2019/0156426 A1* 5/2019 Drucker ............ G06Q 30/0185

* cited by examiner

Primary Examiner — Xilin Guo

(57) ABSTRACT

A cognitive assessment system enabling an object under test to complete self-cognitive assessment required for the financial risk control services in the network platform environment. The invention provides an environment platform for the object under test to obtain the self-cognitive results required for the risk control services, so as to judge the credit attitude and capability of the object under test, avoid the financial credit risks, and thoroughly solve the defect that the attitude of the object under test cannot be measured through the traditional risk control assessment. In view of the risk control in credit business, the invention solves the risk problems of actual credit capacity and credit attitude of natural persons or enterprises and public institutions, avoids the errors caused by a questionnaire method in traditional operations, improves and enriches the risk control content in the financial industry.

21 Claims, 10 Drawing Sheets

COGNITIVE ASSESSMENT SYSTEM

CROSS-REFERENCE TO PRIOR APPLICATION

The present application claims the benefit of Chinese Patent Application No. 201910263403.8 filed on Apr. 2, 2019, the contents of which are incorporated herein by reference.

TECHNICAL FIELD

The invention relates to the financial technical field, in particular to a cognitive assessment system.

BACKGROUND

With the continuous development of credit business in the financial industry, some problems are being emerged such as asymmetric credit reporting, delayed updating of credit reporting data and incomplete population coverage, which make it difficult for financial institutions to obtain traditional credit information and assess their risks. As a result, financial industry has to bear increased screening costs and business risks. Even worse, with the continuous social and economic development, the risk control in financial industry still relies on traditional operational processes and methods. The credit industry usually estimates the current credit status of natural persons or enterprises and institutions such as legal persons and non-legal persons, and judges whether they have the ability to perform credit responsibilities by measuring, analyzing and researching the comprehensive information of the objects under test. However, as a matter of fact, the current process, i.e. assessing the capability of an object under test only, and afterwards restricting him through laws and regulations, is becoming increasingly difficult to meet the business innovation.

In the traditional process, a judgment is made as to current credit status of the objects under test and whether they are able to perform credit responsibilities through the calculation, analysis and research of the credit history of natural persons or enterprises and institutions such as legal persons and non-legal persons, as well as comprehensive information of various factors, states and behaviors that constitute their qualifications and qualities.

The development of the financial industry cannot avoid those with poor credit reporting, some with poor credit reporting may pay more attention to their own credit recording, and thus this group cannot be ignored with development of the financial industry.

The traditional risk control assessment mode of the financial industry does not have strong scale effect, and may generate and obtain false data; and the isolated data obtained can be used for reference only rather than as quantification basis or standard data. In other words, such assessment method is not significant actually. Moreover, another defect of the traditional risk control assessment mode lies in that it cannot determine the attitude of the object under test. Besides, there is still a lack of self-assessment system in the fields of leasing, reservation service, visa, marriage market, insurance, education and job evaluation.

SUMMARY OF THE INVENTION

The purpose of the invention is to overcome the shortcomings of the prior art and to provide a cognitive assessment system, which is a technical realization of a self-cognitive concept in psychology and is transplanted to electronic equipment, thus thoroughly solving the defect that the attitude of an object under test cannot be measured through the traditional risk control assessment. The invention solves the risk problem of actual credit capacity and credit attitude of natural persons or enterprises and institutions in view of the risk control in credit business, and avoids the error caused by the questionnaire method in the traditional operation. The invention provides an environment platform for an object under test to obtain the self-cognitive results required for the risk control services, which are used to judge the credit attitude and capability of the object under test, so as to avoid the financial credit risk. It achieves the purpose of screening out those with repaying capability, good credit attitude and low risk through effective test and assessment on natural persons or organizations or groups with poor credit reporting, improves and enriches the risk control content in the financial industry.

The purpose of the invention is realized by the following technical schemes:

A cognitive assessment system, comprising:

a network platform environment built for an object under test to complete the self-cognitive assessment required for the financial risk control services in the network platform environment; wherein the object under test comprises one or more of individuals, collectives and organizations;

the self-cognitive assessment is applicable to corrective individuals and/or corrective collectives, and/or corrective organizations, and/or a low-risk group among those with poor credit reporting; the self-cognitive assessment involves judging the credit attitude and credit capacity of the object under test; and the network platform environment comprises a scene case built based on an augmented reality device and/or a virtual reality device;

further comprising:

an assessment terminal, comprising a controller, an image acquisition module and a display module; wherein the image acquisition module acquires and transmits the real scene data to the controller for digital processing and constructing a scene case; the display module presents the scene case to interact the digitalized data with the networking device through a networking mode; and the display module comprises an augmented reality device and/or a virtual reality device;

an assessment module, comprising the following processes:

when a user enters the main interface of the assessment module, the user logged into the main interface will be given two identities for operating the scene case: organizer and operator;

two states are given for the organizer and the operator in the scene case; i.e. operation state and view state; and all people getting involved in the assessment process interact with the controller through hands, fingers and gestures or the operation of the controller after entering the same scene case;

the operator selects an organization mode comprising an individual mode and a group mode; in the individual mode, the operator continues to select the scene mode and then enters the operation section; in the group mode, the identity of the operator will be changed to the organizer who will select the scene mode and then enter the operation part;

the operator will operate according to the scheduled sequence after entering the operation part; the backend server will give a prompt description at the beginning of each round of scenes, based on which each operator can create and edit one or more prototypes; the prototype comprises one or more of models, graphs, pictures and reasonable cognitive behaviors generated by the operator, and each operator leaves at least one prototype in each round of scenes;

the operator can determine the selection mode of current round according to the prompt description at the beginning of each round; wherein the single-choice mode allows the operator to leave one prototype only in the scene in the current round, and the multi-choice mode allows the operator to leave at least one prototype in the scene in the current round, but not more than the maximum number of prototypes in the prompt content;

the organizer selects an application scene mode to be started, comprising a plane mode and a stereo mode, and then determines the invitees and the operation sequence; the number of invitees is not limited and the invitees can enter the operation part at any time during the invitation period; and the identity of the invitees is changed into the operator after entering the operation part;

in the individual mode, the next round will start when the previous operation comes to an end; whereas, in the group mode, current operator may end his current operation round through touch control, voice or gesture; after the previous operation comes to an end, the system will jump to the next operator in sequence and to the next round until the last operator ends his operation; the operation behavior, feedback and interaction data of the operator will be recorded and uploaded to the server where a self-cognitive model will be generated;

an output module used for outputting the self-cognitive model of the object under test to a financial industry risk control service system, wherein the presentation mode of the self-cognitive model comprises one or more of scores, feature descriptions, color marks and shape marks.

and an artificial intelligence module, wherein the artificial intelligence module is used for mapping a prototype to a prototype library so that a quantified prototype can maintain continuous learning and iteration under the learning environment of an artificial intelligence machine, copying, imitating and improving the behavior of an operator through artificial intelligence, and simulating the thinking model and cognitive behavior model of an operator, thereby replacing actual reviewers with artificial intelligence.

Further, the prototype comprises one or more of human beings, animals, plants, buildings, furniture and daily supplies, transportation, food, stones and shells, natural substances and meteorology.

Further, each operator can place, drag, zoom, rotate, flip, delete, discolor and colorize the prototype; and the operation rules for prototype and scene are consistent in the individual mode and the group mode;

place: selecting a prototype from a prototype library and then placing the prototype into a scene case; drag: changing the coordinate position of the prototype with the moving finger or other operations capable of determining movement; zoom: operating a prototype according to the relative distance between two moving fingers or between the changes determined, and enlarging or reducing a prototype once or continuously according to a set proportion; rotate: determining the rotation axis according to the moving direction of fingers or other operations that can determine the direction, and rotating once or continuously according to the set angle value; flip: determining the direction of a prototype according to the moving direction of double fingers or other operations that can distinguish the rotation, determining the flipped axis according to the current prototype orientation and operation direction, and flipping the prototype; delete: the processing result after dragging a prototype outside the operation area of the scene.

Further, each operator can change the weather, the meteorology and the theme color of a scene in a scene case; and the operator can zoom with the lens to observe and operate the local scene in close range in the stereo mode.

Further, the number of rounds of operation is limited in the individual mode, and the operation behavior data are submitted to the server side in the last round; there is no limit on the number of rounds in the group mode, and the final power to submit operational behavior data is controlled by the organizer.

Further, the scene case comprises a virtual reality scene case and/or an augmented reality scene case; if a real test room is used as a template for production in the virtual reality environment, scenes, prototype libraries, prototypes and articles required for real scenes are arranged in the scene room in the virtual reality environment, and the image effects of other operators are also arranged for the group scene case; and the production site shall be the site of current organizer in an augmented reality environment.

Further, the controller of the assessment terminal comprises a processor, the image acquisition module thereof comprises a camera, and the display module thereof comprises a display screen;

the camera captures the imaging in the field of view to acquire and transmit the real scene data to the processor for digital processing and constructing a scene case, and presents the scene case on the display screen to interact the digitalized data with the networking device in a networking mode; and the display screen comprises a virtual display device screen and/or an augmented reality device display screen;

the assessment terminal further comprises a bone conduction headphone, a microphone, power source, a brain wave collector, a scene switch and a catcher; wherein the bone conduction headphone transmits sound to a user; the power source supplies electricity; the microphone interacts the voice data; the display screen displays the images seen by users in an augmented reality scene and/or a virtual reality scene; the brain wave collector reads the user brain wave data; the scene switch controls the switching between the virtual reality scene and the augmented reality scene; and the catcher captures the body movements of users in the augmented reality scene and/or the virtual reality scene.

Further, the system can interact with the operation of the controller through the voice control signal of the microphone and/or the mind control signal of the brain wave collector after all people getting involved in the assessment process enter the same scene case, record and upload the operation behavior, feedback and interaction data of the operator to the server side where a self-cognitive model will be generated; wherein the self-cognitive model comprises a bluetooth module used for data communication with the server and interacting with other users at the same time; a wireless communication module used for data communication with the server and interacting with other users at the same time; a cable interface used for data communication with the server and interacting with other users at the same time; a USB interface for storing data generated by the current user; a gyroscope for collecting azimuth data; and a positioning module used for Beidou positioning, GPS positioning, GLONASS positioning or Galileo satellite navigation system positioning.

The beneficial effects of the invention are as follows:

(1) The invention provides a set of service system for evaluating the real attitude and actual repaying capability of natural persons, collectives and organizations in credit financing through a large number of tests, quantification of real feelings of people and summary of business experience data. This system does not yet exist before the application date of the application, and thus fills the gap in the risk control system of the financial industry.

(2) Specifically, in the virtual environment, users can get rid of the physical rules in the real world under specific circumstances, and effectively carry out all-round operations on scenes and prototypes. As a result, the data statistics actually tested and assessed by the organizer can be converted into data information of the scene case operation of the invention for digital processing.

(3) The invention is applicable to the self-cognition test and assessment of natural persons, organizations and collectives in the financial industry, as well as the leasing industry, reservation service industry, visa, marriage market, insurance industry, education industry and occupation evaluation. In combination with the self-learning and perfection characteristics of artificial intelligence, it may continuously improve the accuracy and effectiveness of the conclusion. Specifically, according to the existing physical rules, it can simulate a real natural environment in a complete virtual environment, which allows the operator to have a sense of vision, hearing, touch and movement and all the senses that human beings can have, feel like he stays in a real environment, and enjoy the operation feeling and interaction obtained by feedback and response generated when interacting with the virtual environment. The features of a virtual environment itself are autonomy and diversity even if no operator gets involved, and all information in the virtual scene is digitized. In addition, the sensory experience beyond reality can be achieved through simulation and superposition of the scene information (image, sound, touch and the like) which is difficult to experience in a certain time and space range of the real world, and by applying the virtual information to a real scene and allowing them to be sensed by human beings. The real-time superposition of the real environment and virtual objects into the same scene can effectively test and assess different types of individuals, groups, organizations and groups, and provide a self-cognition model which cannot be clearly depicted by an object under test.

(4) The risk control assessment system provided by the invention is a technical realization of the self-cognitive concept in psychology and is transplanted to electronic equipment. Thus, it thoroughly solves the defect that the attitude of the object under test cannot be measured in traditional risk control assessment, solves the risk problems of actual credit capacity and credit attitude of natural persons or enterprises and public institutions in view of the risk control in credit business, and avoids the errors caused by a questionnaire method in traditional operations. The invention provides an environment platform for an object under test to obtain the self-cognitive results required for the risk control services, which are used to judge the credit attitude and capability of the object under test, so as to avoid the financial credit risk.

(5) The invention can timely and effectively test and assess the corrective individuals, collectives and organizations among those with poor credit reporting. In the traditional financial industry, the one-size-fits-all approach is adopted for natural persons, organizations and collectives with poor credit reporting from the perspective of risk control. The good news is, the invention can screen out those with repaying capability, good credit attitude and low risk through effective test and assessment on natural persons or organizations or groups with poor credit reporting, thus improves and enriches the risk control content in the financial industry.

(6) The invention can provide an organized, large-scale and specialized evaluation service, so as to reduce the cost and improve the efficiency, and obtain more data conclusions by using big data with the increase of the number of evaluations.

(7) The invention can be used to analyze and predict the motivation behavior tendency of the object under test, including personal motives and group motives.

(8) The invention can further enable artificial intelligence to copy, simulate and improve the operator's behavior, so as to simulate his thinking model and cognitive behavior model, and achieve the effect of intelligent cultivation through continuous summary and improvement.

BRIEF DESCRIPTION OF THE DRAWINGS

In order to clearly describe the embodiments of the invention or the technical scheme in the prior art, the embodiments or drawings used in technical description will be simply introduced as follows. Apparently, the drawings described below are only some embodiments of the invention. Those of ordinary skill in the art can obtain other drawings based on these drawings without creative work.

Figure 1:
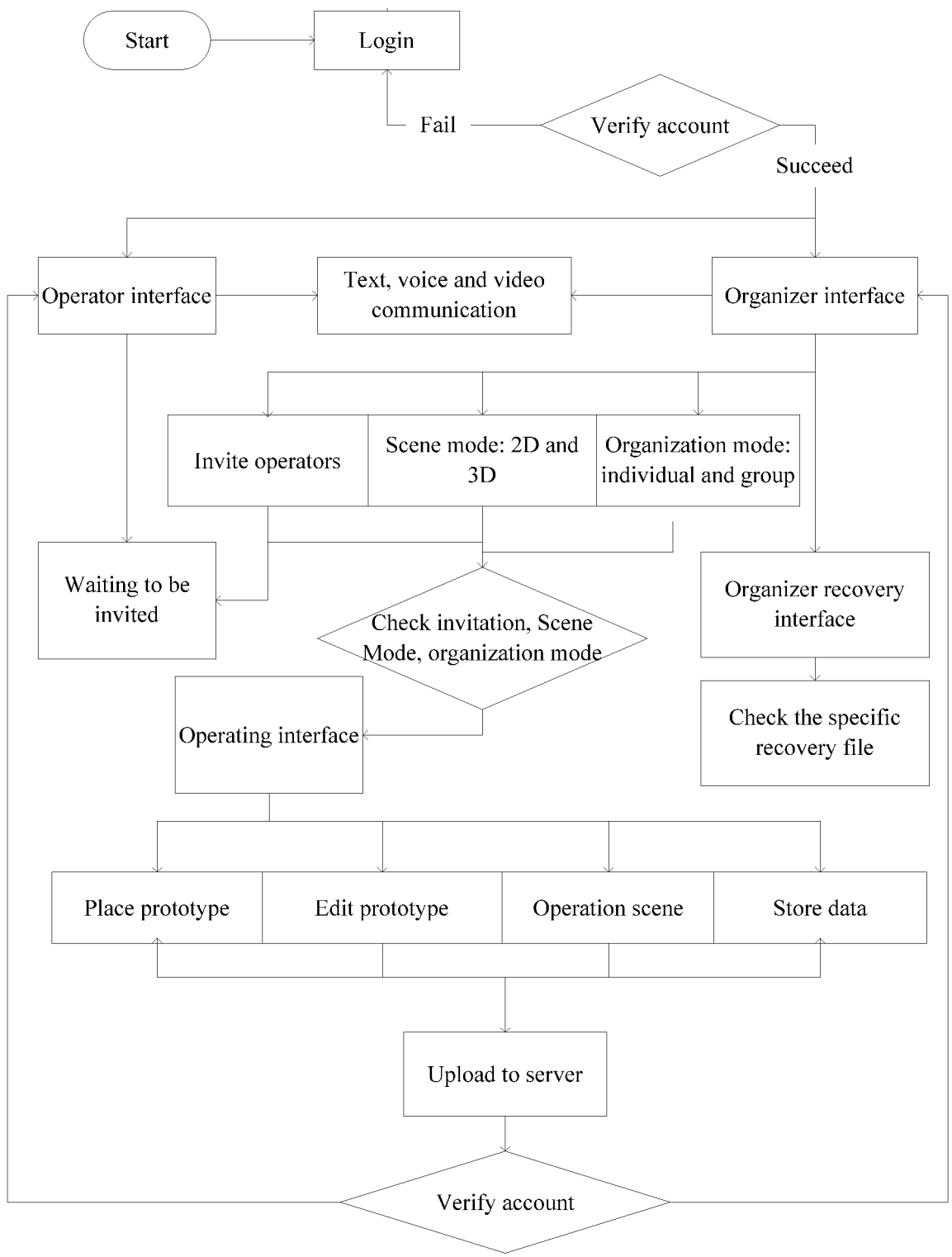
FIG. 1 is a flow chart of self-cognitive assessment of the invention.

In the figure, 1—bone conduction headphone, 2—microphone, 3—processor, 4—display screen, 5—power source, 6—brain wave collector, 7—scene switch, 8—catcher, 9—camera, 21—positioning module, 22—wireless communication module, 23—bluetooth module, 24—gyroscope, 31—USB interface, 32—cable interface, 10—task module, 11—operation module, 12—title module, 13—description module, 14—deletion module, 15—prototype library module, 16—prototype module, 17—scene module, 18—system function module.

DETAILED DESCRIPTION OF THE PREFERRED EMBODIMENT

The technical scheme of the invention will be described in further detail below with reference to the accompanying drawings, but the protection scope of the invention is not limited to the following example. All features or steps in all methods and procedures disclosed in the specification can be combined in any way, except mutually exclusive features and/or steps.

Any feature disclosed in the specification (including any claims, abstract and drawings attached) can be replaced with other equivalent or similar features, unless otherwise specified, that is, each feature is only an example of series of equivalent or similar features, unless otherwise specified.

Various embodiments of the invention will be described in detail below. It should be noted that the embodiments described herein are for illustration only and are not intended to limit the invention. As described below, numerous specific details are set forth in order to provide a thorough understanding of the invention. However, it will be apparent to those of ordinary skill in the art that the invention may not necessarily be realized with these specific details. In other embodiments, well-known circuits, software or methods have not been specifically described in order to avoid confusion with the invention.

The technical scheme in the embodiments of the invention will be described clearly and completely as follows. Apparently, the embodiments described are only some embodiments of the invention, but not all embodiments. Based on the embodiments of the invention, all other embodiments obtained by those of ordinary skill in the art without creative work shall fall within the protection scope of the invention.

Before describing the embodiments, some necessary terms need to be explained. For example:

The terms such as "first" and "second" do not limit various elements but distinguish one element from another when used to describe these elements in this application. Therefore, the "first" element discussed below may also be referred to as a "second" element without departing from the teachings of the invention. It should be understood that, an element being "connected" or "coupled" to another element may indicate that the element can be directly connected or coupled to another element, or an additional element is arranged between them. Conversely, an element being "directly connected" or "directly coupled" to another element indicates that there is no any additional element between them.

The various terms in this application are used to describe the purpose of various embodiments only and are not intended to limit the invention, and the singular form is intended to include the plural form unless otherwise indicated in the context.

The terms "consisting of" and/or "comprising", when used in this specification, only specify the presence of said features, entirety, steps, operations, elements, and/or components, but do not preclude the presence and/or addition of one or more other features, entirety, steps, operations, elements, components, and/or groups thereof.

As shown in FIG. 1 to FIG. 11, a cognitive assessment system comprises:

a network platform environment built for an object under test to complete the self-cognitive assessment required for the financial risk control services in the network platform environment; wherein the object under test comprises one or more of individuals, collectives and organizations;

the self-cognitive assessment is applicable to corrective individuals and/or corrective collectives, and/or corrective organizations, and/or a low-risk group among those with poor credit reporting; the self-cognitive assessment involves judging the credit attitude and credit capacity of the object under test; and the network platform environment comprises a scene case built based on an augmented reality device and/or a virtual reality device.

Further comprises:

an assessment terminal, comprising a controller, an image acquisition module and a display module; wherein the image acquisition module acquires and transmits the real scene data to the controller for digital processing and constructing a scene case; the display module presents the scene case to interact the digitalized data with the networking device through a networking mode; and the display module comprises an augmented reality device and/or a virtual reality device;

an assessment module, comprising the following processes:

when a user enters the main interface of the assessment module, the user logged into the main interface will be given two identities for operating the scene case: organizer and operator;

two states are given for the organizer and the operator in the scene case; i.e. operation state and view state; and all people getting involved in the assessment process interact with the controller through hands, fingers and gestures or the operation of the controller after entering the same scene case;

the operator selects an organization mode comprising an individual mode and a group mode; in the individual mode, the operator continues to select the scene mode and then enters the operation section; in the group mode, the identity of the operator will be changed to the organizer who will select the scene mode and then enter the operation part;

the operator will operate according to the scheduled sequence after entering the operation part; the backend server will give a prompt description at the beginning of each round of scenes, based on which each operator can create and edit one or more prototypes; the prototype comprises one or more of models, graphs, pictures and reasonable cognitive behaviors generated by the operator, and each operator leaves at least one prototype in each round of scenes;

the operator can determine the selection mode of current round according to the prompt description at the beginning of each round; wherein the single-choice mode allows the operator to leave one prototype only in the scene in the current round, and the multi-choice mode allows the operator to leave at least one prototype in the scene in the current round, but not more than the maximum number of prototypes in the prompt content;

the organizer selects an application scene mode to be started, comprising a plane mode and a stereo mode, and then determines the invitees and the operation sequence; the number of invitees is not limited and the invitees can enter the operation part at any time during the invitation period; and the identity of the invitees is changed into the operator after entering the operation part;

in the individual mode, the next round will start when the previous operation comes to an end; whereas, in the group mode, current operator may end his current operation round through touch control, voice or gesture; after the previous operation comes to an end, the system will jump to the next operator in sequence and to the next round until the last operator ends his operation; the operation behavior, feedback and interaction data of the operator will be recorded and uploaded to the server where a self-cognitive model will be generated;

and an output module used for outputting the self-cognitive model of the object under test to a financial industry risk control service system, wherein the presentation mode of the self-cognitive model comprises one or more of scores, feature descriptions, color marks and shape marks.

and an artificial intelligence module, wherein the artificial intelligence module is used for mapping a prototype to a prototype library so that a quantified prototype can maintain continuous learning and iteration under the learning environment of an artificial intelligence machine, copying, imitating and improving the behavior of an operator through artificial intelligence, and simulating the thinking model and cognitive behavior model of an operator, thereby replacing actual reviewers with artificial intelligence.

Further, the prototype comprises one or more of human beings, animals, plants, buildings, furniture and daily supplies, transportation, food, stones and shells, natural substances and meteorology.

Further, each operator can place, drag, zoom, rotate, flip, delete, discolor and colorize the prototype; and the operation rules for prototype and scene are consistent in the individual mode and the group mode;

place: selecting a prototype from a prototype library and then placing the prototype into a scene case; drag: changing the coordinate position of the prototype with the moving finger or other operations capable of determining movement; zoom: operating a prototype according to the relative distance between two moving fingers or between the changes determined, and enlarging or reducing a prototype once or continuously according to a set proportion; rotate: determining the rotation axis according to the moving direction of fingers or other operations that can determine the direction, and rotating once or continuously according to the set angle value; flip: determining the direction of a prototype according to the moving direction of double fingers or other operations that can distinguish the rotation, determining the flipped axis according to the current prototype orientation and operation direction, and flipping the prototype; delete: the processing result after dragging a prototype outside the operation area of the scene.

Further, each operator can change the weather, the meteorology and the theme color of a scene in a scene case; and the operator can zoom with the lens to observe and operate the local scene in close range in the stereo mode.

Further, the number of rounds of operation is limited in the individual mode, and the operation behavior data are submitted to the server side in the last round; there is no limit on the number of rounds in the group mode, and the final power to submit operational behavior data is controlled by the organizer.

Further, the scene case comprises a virtual reality scene case and/or an augmented reality scene case; if a real test room is used as a template for production in the virtual reality environment, scenes, prototype libraries, prototypes and articles required for real scenes are arranged in the scene room in the virtual reality environment, and the image effects of other operators are also arranged for the group scene case; and the production site shall be the site of current organizer in an augmented reality environment.

Further, the controller of the assessment terminal comprises a processor 3, the image acquisition module thereof comprises a camera 9, and the display module thereof comprises a display screen 4;

the camera 9 captures the imaging in the field of view to acquire and transmit the real scene data to the processor 3 for digital processing and constructing a scene case, and presents the scene case on the display screen 4 to interact the digitalized data with the networking device in a networking mode; and the display screen 4 comprises a virtual display device screen and/or an augmented reality device display screen;

the assessment terminal further comprises a bone conduction headphone 1, a microphone 2, power source 5, a brain wave collector 6, a scene switch 7 and a catcher 8; wherein the bone conduction headphone 1 transmits sound to a user; the power source 5 supplies electricity; the microphone 2 interacts the voice data; the display screen 4 displays the images seen by users in an augmented reality scene and/or a virtual reality scene; the brain wave collector 6 reads the user brain wave data; the scene switch 7 controls the switching between the virtual reality scene and the augmented reality scene; and the catcher 8 captures the body movements of users in the augmented reality scene and/or the virtual reality scene.

Further, the system can interact with the operation of the controller through the voice control signal of the microphone 2 and/or the mind control signal of the brain wave collector 6 after all people getting involved in the assessment process enter the same scene case, record and upload the operation behavior, feedback and interaction data of the operator to the server side where a self-cognitive model will be generated; wherein the self-cognitive model comprises a bluetooth module 23 used for data communication with the server and interacting with other users at the same time; a wireless communication module 22 used for data communication with the server and interacting with other users at the same time; a cable interface 32 used for data communication with the server and interacting with other users at the same time; a USB interface 31 for storing data generated by the current user; a gyroscope 24 for collecting azimuth data; and a positioning module 21 used for Beidou positioning, GPS positioning, GLONASS positioning or Galileo satellite navigation system positioning.

The scene room is also known as the virtual scene room, which is produced by taking a real test room as a model in virtual reality (VR). In the virtual reality environment, there are scenes, prototype libraries, prototypes, and other items necessary for real scenes in the scene room. In addition, a group scene case also includes the image effects of other operators. In an augmented reality (AR) environment, the room or venue where the current organizer is located may be used.

The positions and functions of the task module 10, the operation module 11, the title module 12, the description module 13, the deletion module 14, the prototype library module 15, the prototype module 16, the scene module 17 and the system function module 18 in the interface are illustrated in FIG. 4 to FIG. 11.

Wherein, Task module 10: operation and introduction of the task, including title and description. Operation module 11: proceed to the next step according to the operation requirements in the description. The title module 12: title of operation requirements. Description module 13: description of operation requirements. Delete module 14: drag and delete a prototype here. Prototype library module 15: operate the interface prototype: sort by selection, select, place, edit and delete. Prototype module 16: the prototype can be edited as follows: move, zoom in, zoom out, flip, rotate and adjust the color. Scene module 17: prototype placement and editing area. System function module 18: different function modules will appear according to the specific contents described: prototype library, next step, check and submit.

EXAMPLE 1

Figure 2:
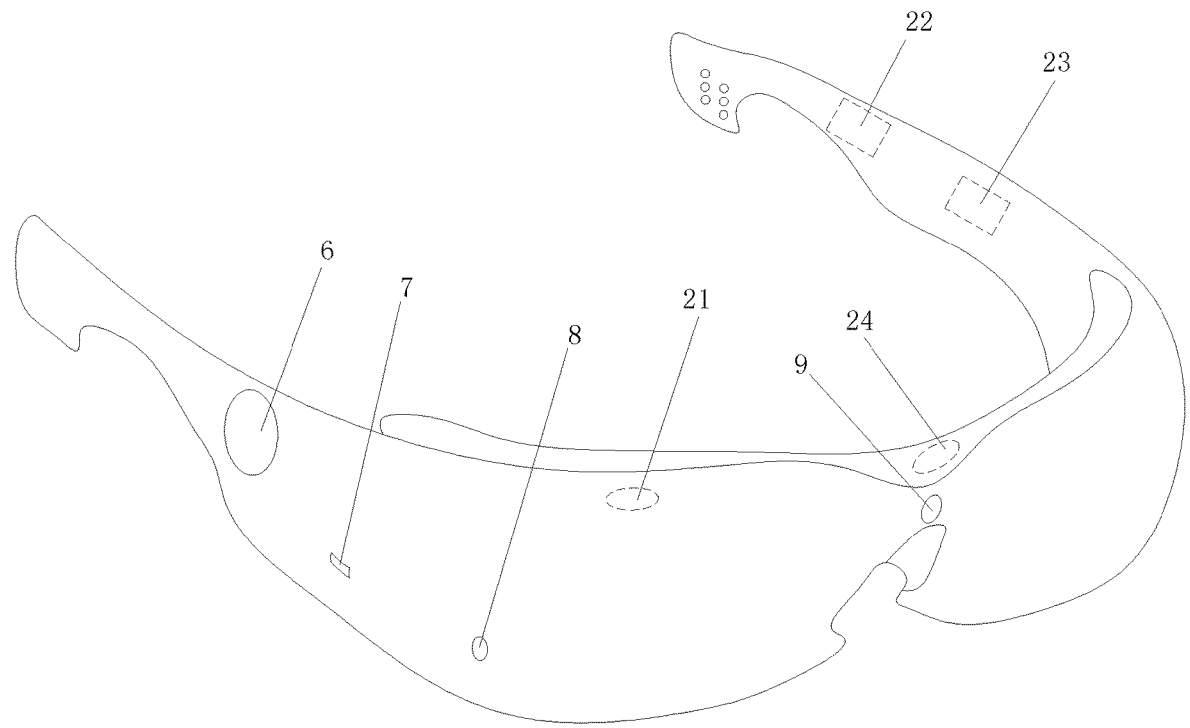
FIG. 2 is a first structural diagram of an assessment terminal of the invention.
Figure 3:
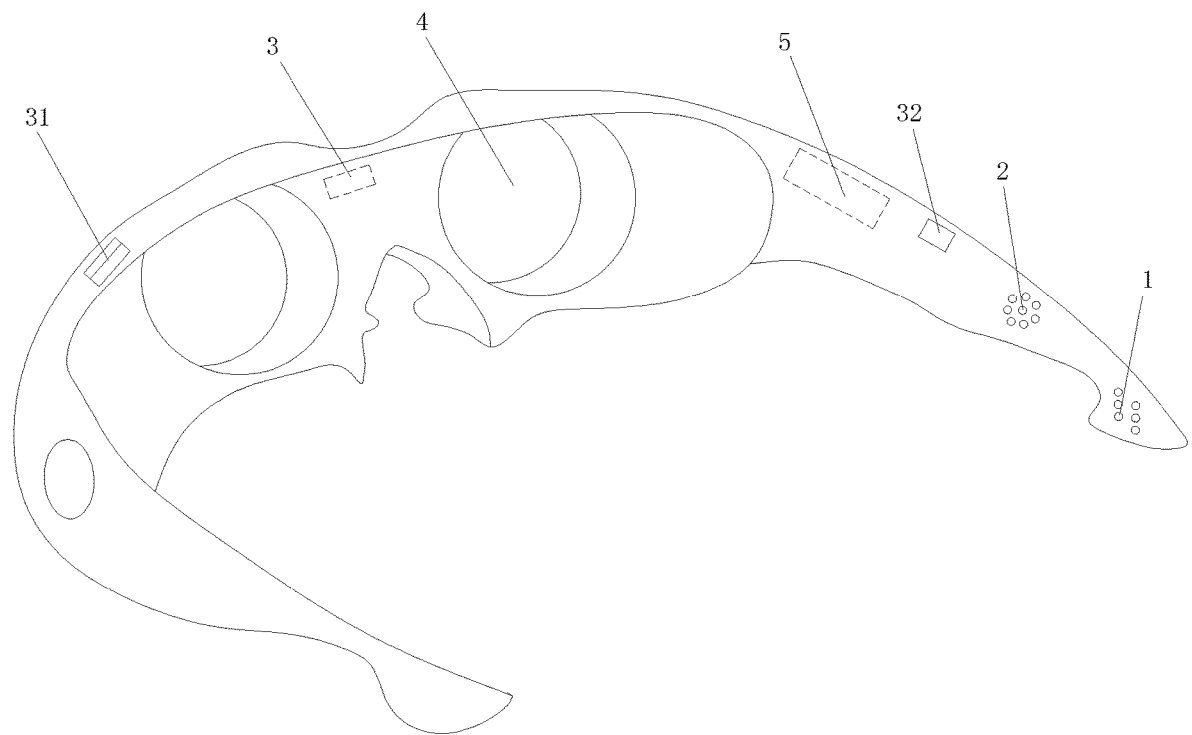
FIG. 3 is a second structural diagram of an assessment terminal of the invention.
Figure 4:
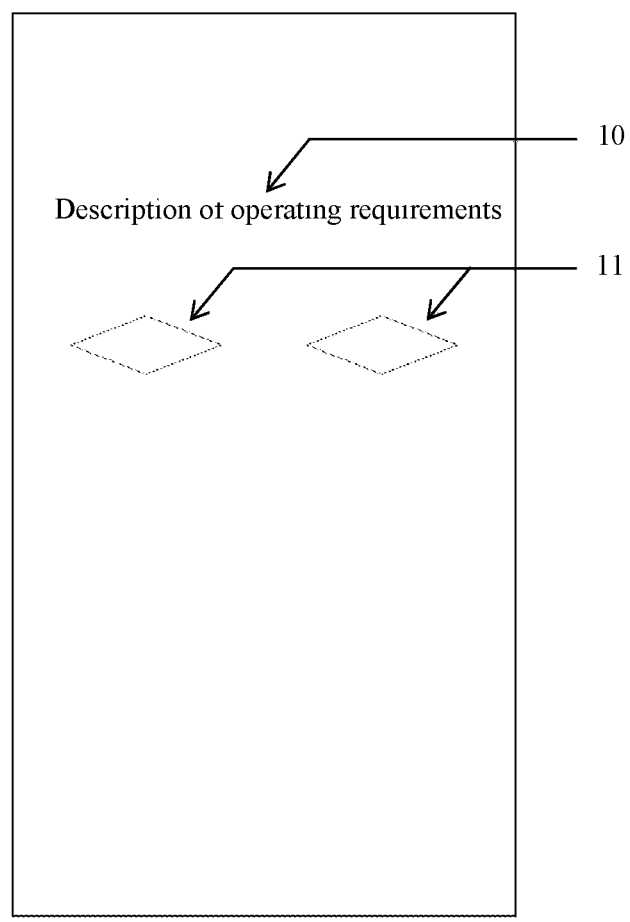
FIG. 4 is a schematic diagram of a first interface layout of the invention.
Figure 5:
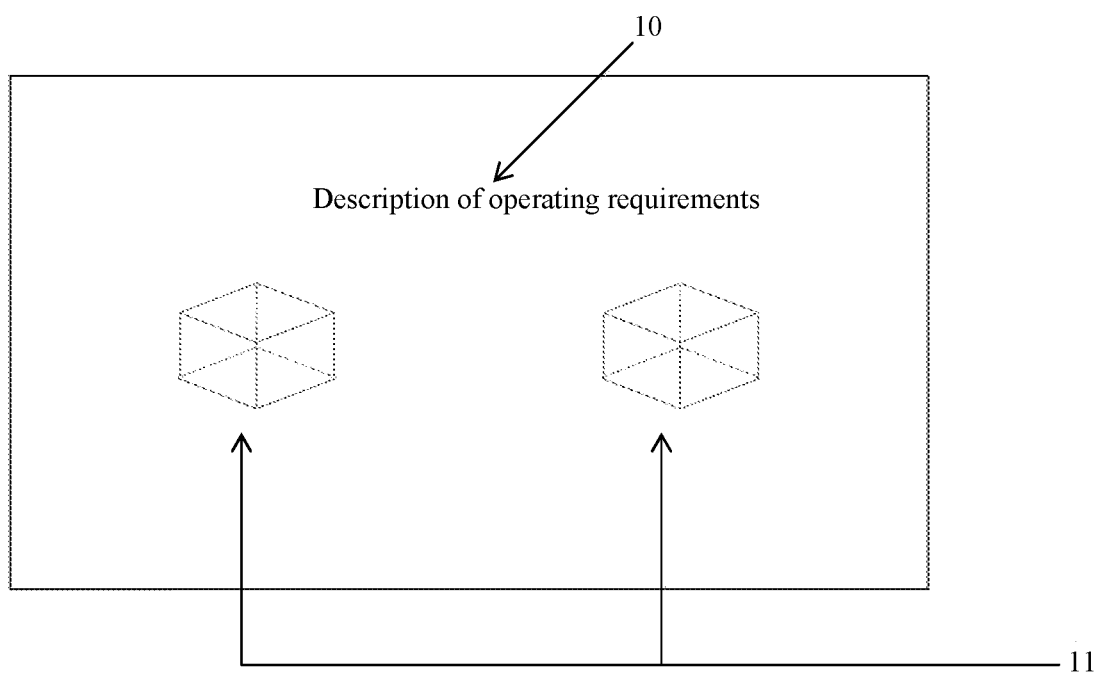
FIG. 5 is a schematic diagram of a second interface layout of the invention.
Figure 6:
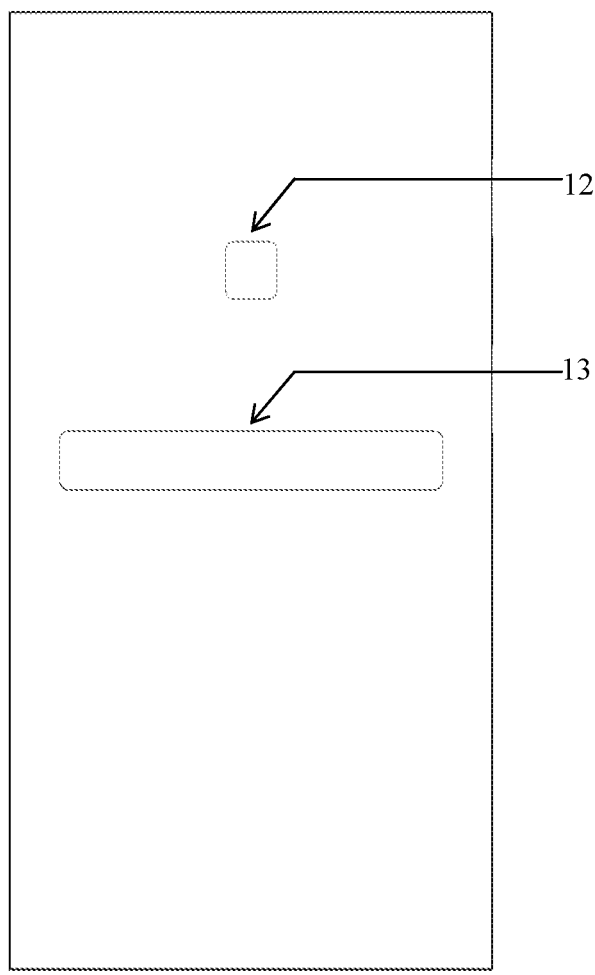
FIG. 6 is a schematic diagram of a third interface layout of the invention.
Figure 7:
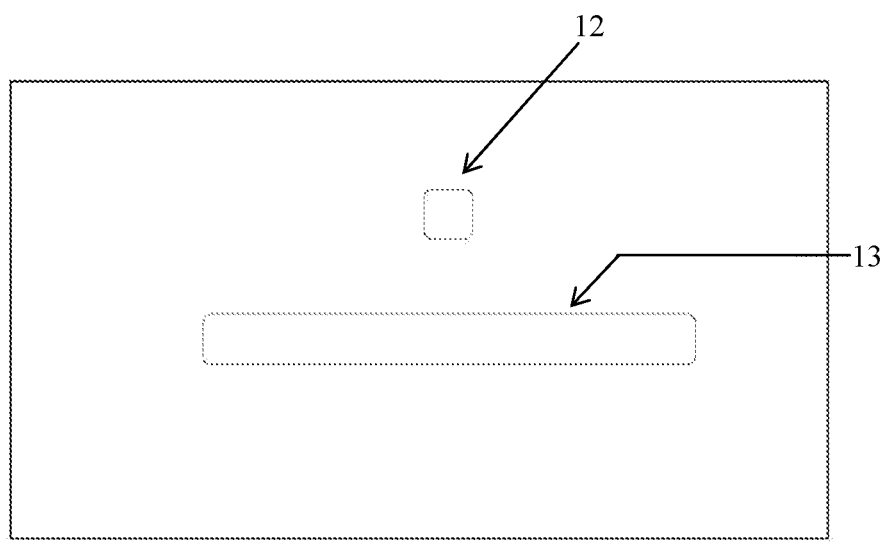
FIG. 7 is a schematic diagram of a fourth interface layout of the invention.
Figure 8:
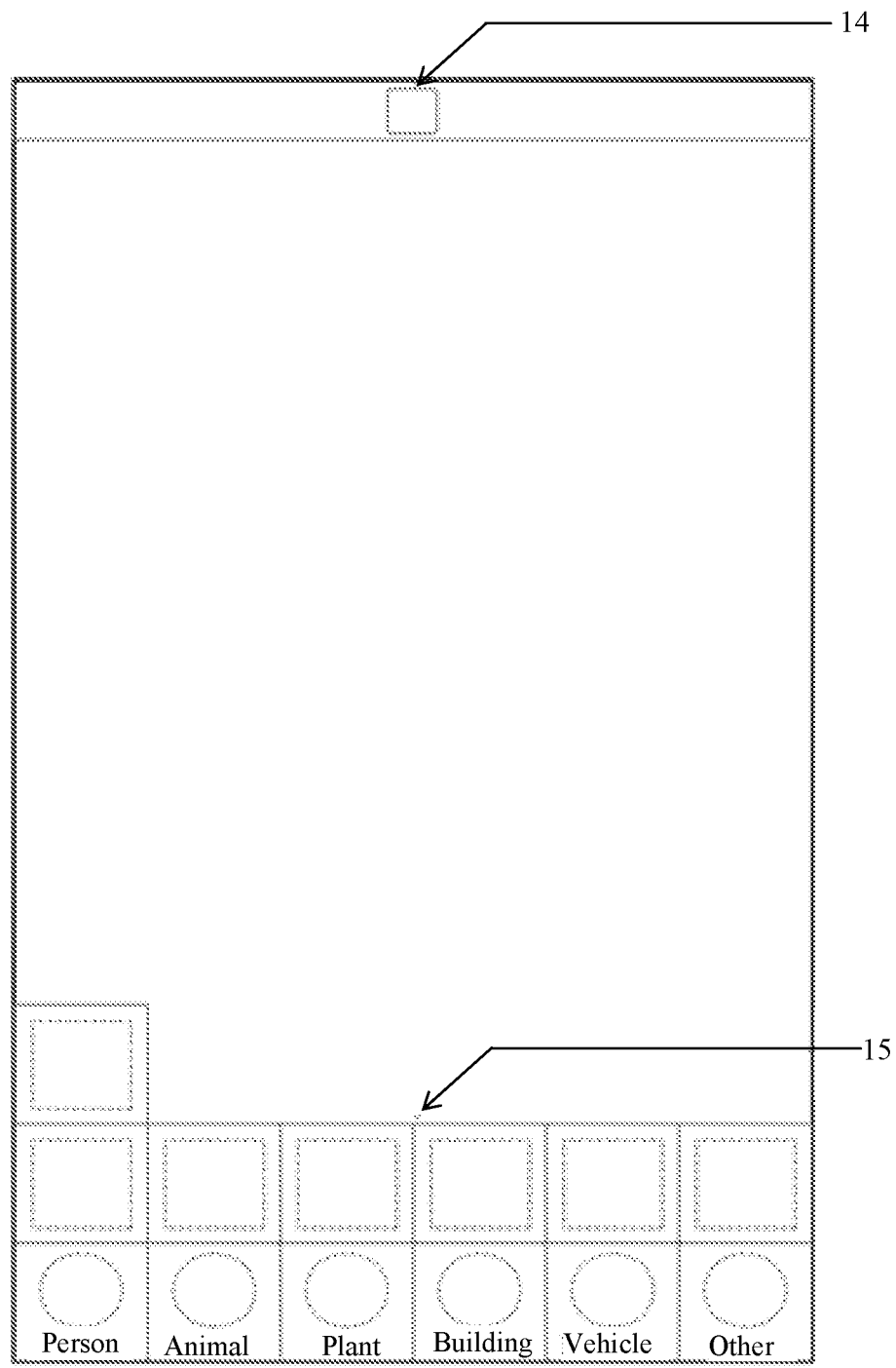
FIG. 8 is a schematic diagram of a fifth interface layout of the invention.
Figure 9:
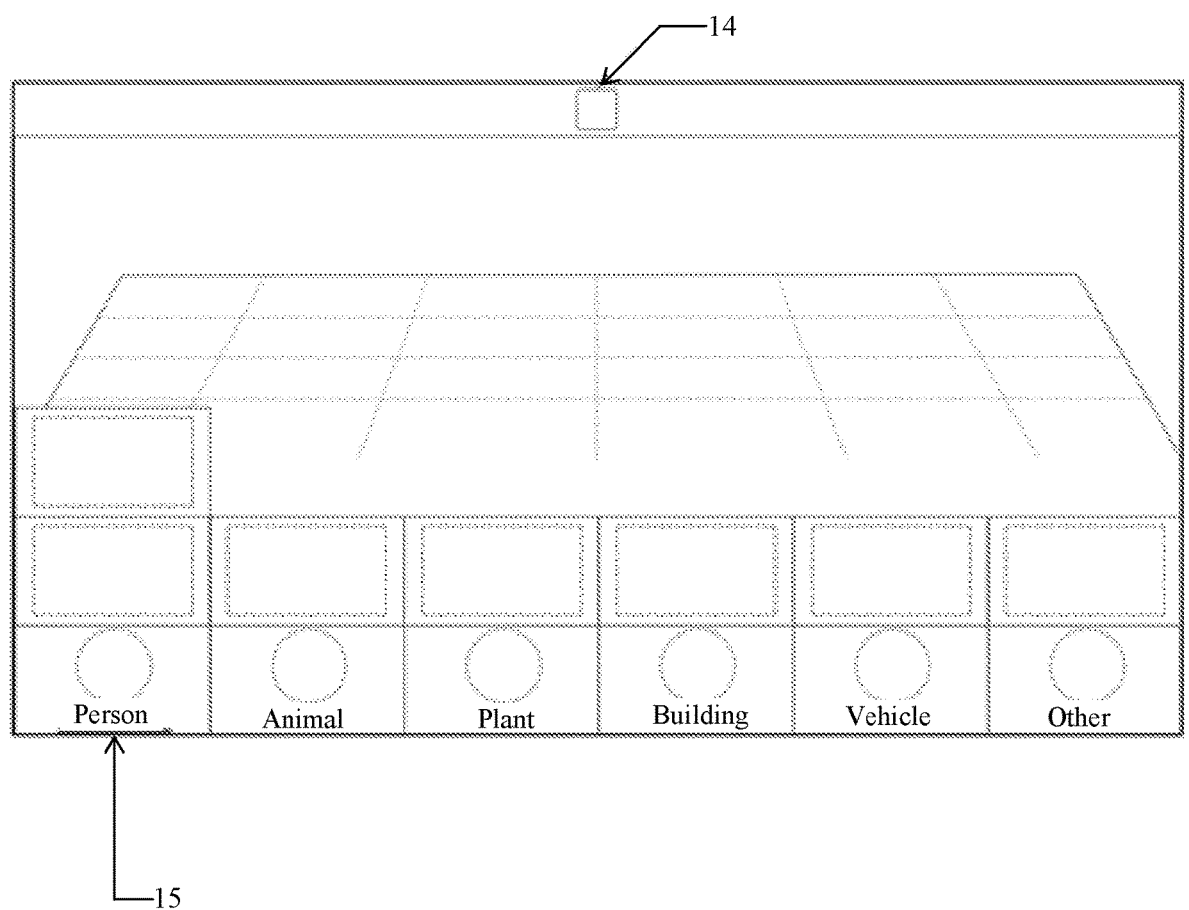
FIG. 9 is a schematic diagram of a sixth interface layout of the invention.
Figure 10:
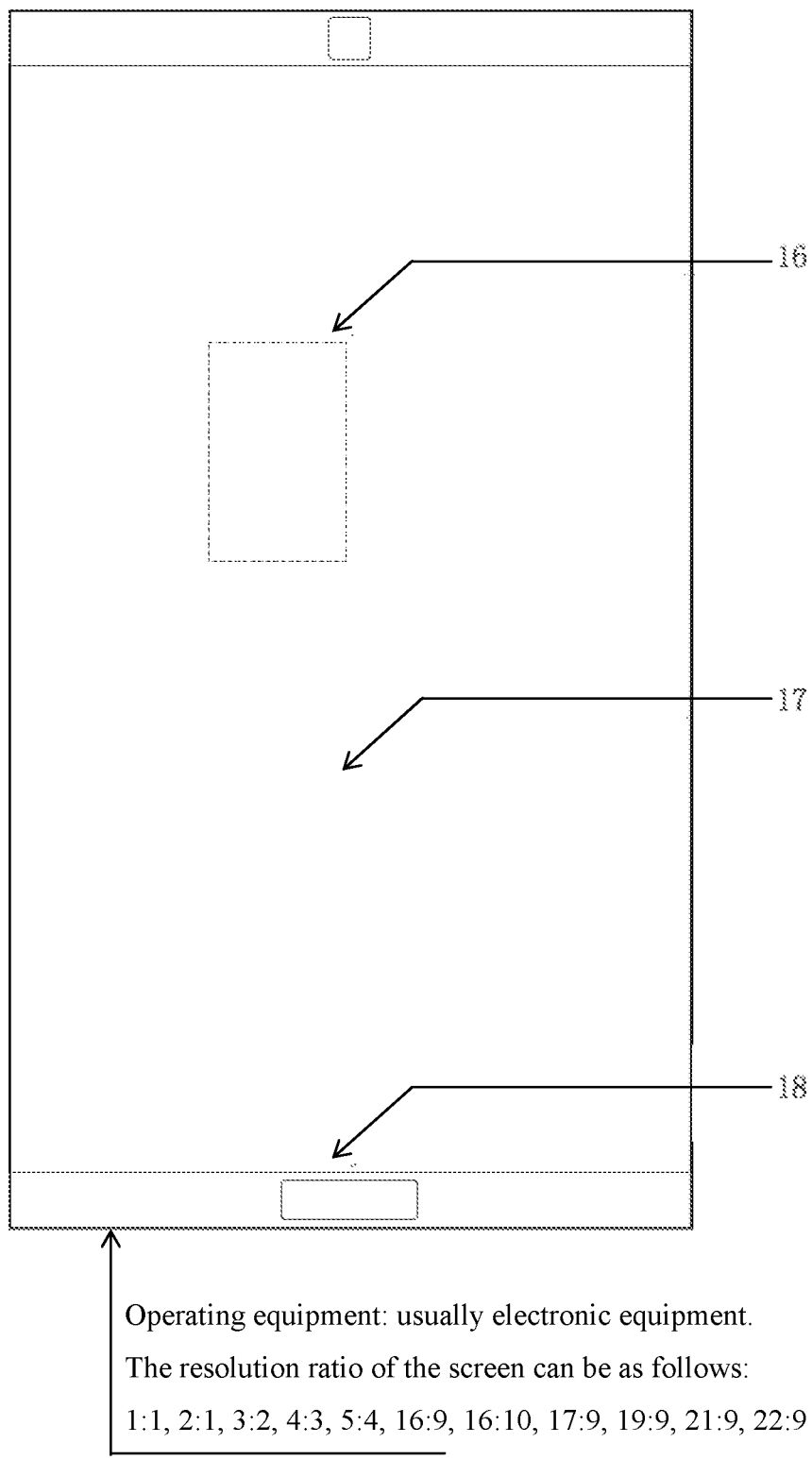
FIG. 10 is a schematic diagram of a seventh interface layout of the invention.
Figure 11:
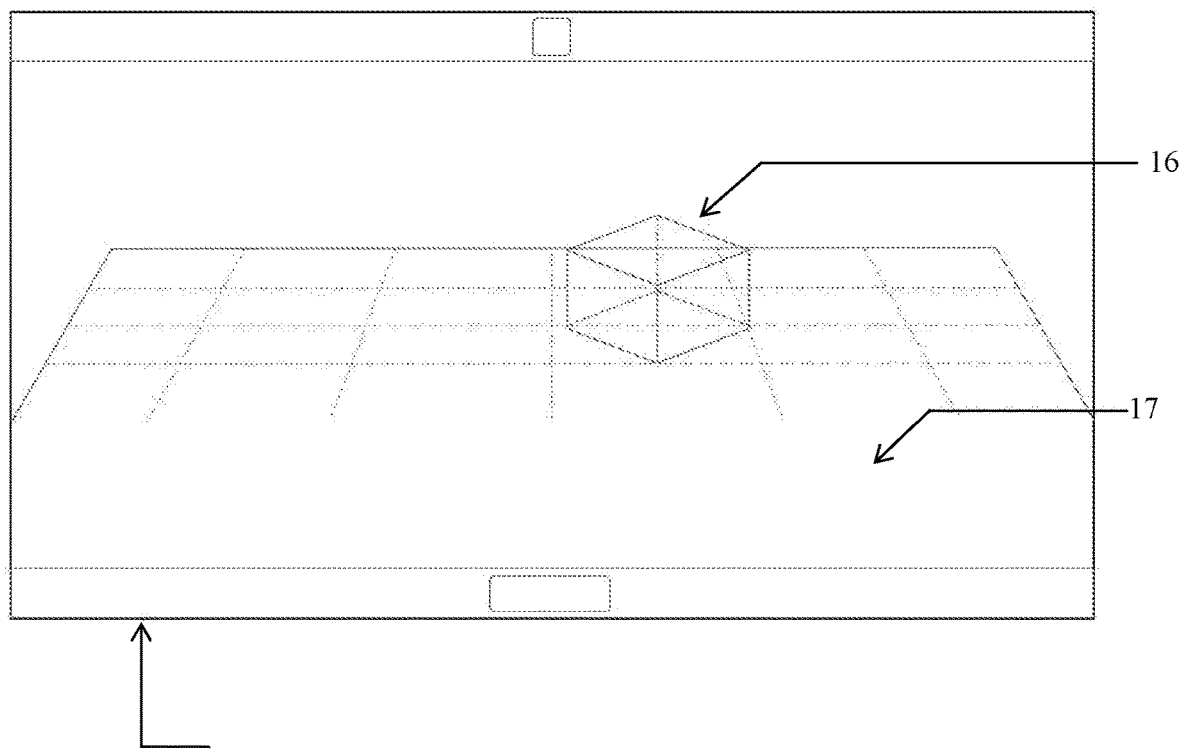
FIG. 11 is a schematic diagram of an eighth interface layout of the invention.

As shown in FIG. 1 to FIG. 3, a cognitive assessment system comprises:

a network platform environment built for an object under test to complete the self-cognitive assessment required for the financial risk control services in the network platform environment; wherein the object under test comprises one or more of individuals, collectives and organizations;

the self-cognitive assessment is applicable to corrective individuals and/or corrective collectives, and/or corrective organizations, and/or a low-risk group among those with poor credit reporting; the self-cognitive assessment involves judging the credit attitude and credit capacity of the object under test; and the network platform environment comprises a scene case built based on an augmented reality device and/or a virtual reality device.

In this example, the cognitive assessment system further comprises:

an assessment terminal, comprising a controller, an image acquisition module and a display module; wherein the image acquisition module acquires and transmits the real scene data to the controller for digital processing and constructing a scene case; the display module presents the scene case to interact the digitalized data with the networking device through a networking mode; and the display module comprises an augmented reality device and/or a virtual reality device;

an assessment module, comprising the following processes:

when a user enters the main interface of the assessment module, the user logged into the main interface will be given two identities for operating the scene case: organizer and operator;

two states are given for the organizer and the operator in the scene case; i.e. operation state and view state; and all people getting involved in the assessment process interact with the controller through hands, fingers and gestures or the operation of the controller after entering the same scene case;

the operator selects an organization mode comprising an individual mode and a group mode; in the individual mode, the operator continues to select the scene mode and then enters the operation section; in the group mode, the identity of the operator will be changed to the organizer who will select the scene mode and then enter the operation part;

the operator will operate according to the scheduled sequence after entering the operation part; the backend server will give a prompt description at the beginning of each round of scenes, based on which each operator can create and edit one or more prototypes; the prototype comprises one or more of models, graphs, pictures and reasonable cognitive behaviors generated by the operator, and each operator leaves at least one prototype in each round of scenes;

the operator can determine the selection mode of current round according to the prompt description at the beginning of each round; wherein the single-choice mode allows the operator to leave one prototype only in the scene in the current round, and the multi-choice mode allows the operator to leave at least one prototype in the scene in the current round, but not more than the maximum number of prototypes in the prompt content;

the organizer selects an application scene mode to be started, comprising a plane mode and a stereo mode, and then determines the invitees and the operation sequence; the number of invitees is not limited and the invitees can enter the operation part at any time during the invitation period; and the identity of the invitees is changed into the operator after entering the operation part;

in the individual mode, the next round will start when the previous operation comes to an end; whereas, in the group mode, current operator may end his current operation round through touch control, voice or gesture; after the previous operation comes to an end, the system will jump to the next operator in sequence and to the next round until the last operator ends his operation; the operation behavior, feedback and interaction data of the operator will be recorded and uploaded to the server where a self-cognitive model will be generated;

and an output module used for outputting the self-cognitive model of the object under test to a financial industry risk control service system, wherein the presentation mode of the self-cognitive model comprises one or more of scores, feature descriptions, color marks and shape marks.

The organizer refers to a unit such as evaluator and artificial intelligence who has permission to view or operate data, in the example:

The prototype, also known as a model and an element, refers to the model, figure and picture in the invention, which can an operable unit, or a cognitive behavior generated by the operator. It can be created through concise modeling design after analyzing the color of various prototypes. In order to give the operator free imaginary space, there are several main categories: people, animals, plants, buildings, furniture and daily supplies, transportation, food, stones and shells, natural substances, meteorology and others. It is mainly originated from the dynamic "prototype image" created according to Carl Gustav Jung's "prototype" and the technical theory of analytical psychology. Different from traditional sand table model, it is the true representation of the innovation of relevant theories in psychology.

The prototype library, also known as a cabinet, refers to a virtual prototype library for storing prototypes and is represented by a space for storing various types of prototypes. All the initial placement operations of prototypes need to be extracted from the prototype library, and some other operations will start from the prototype library. The content of the prototype library can be added manually, or added intelligently in combination with artificial intelligence by analyzing various data of the operator. The prototype in the prototype library used by the operator and its layout are dynamically changed, and different prototype libraries are displayed according to different factors of the operator's occupation, region, age, gender, education level, marital status, credit history, asset, current operation time and current social hot spots.

The scene refers to a virtual scene capable of placing and operating the prototypes, so as to achieve the effects of grassland, lawn, lake and sea through mining and stacking. Many scene styles can be customized. Two scene modes are provided, i.e. 2D environmental space, and 3D environmental space.

Data refer to information and text for storing and marking all behavior information occurring in the invention, including total time, interval time, operation time, various operation actions for scenes and prototypes, etc. Sufficient dimensional data can be provided for the promotion, progress and perfection of artificial intelligence.

The weather refers to the weather change in a scene case.

The angle of view refers to the observation of different orientations of scene cases realized by changing the angle and height of the lens in the group mode.

The interface operation allows the operator to record the operation data in the operation scene; and even in group scene case, to make instant communication with other users in the scene case when part of the work of previous offline organizers is replaced.

The view status allows the organizer and all operators to observe different orientations of the scene case by only moving up and down the lens and changing its angle and height.

The operational state allows operating the scene and prototype, and includes placing a prototype and the operation after placing the prototype. This requires selecting and changing a prototype to be in an operable state, wherein the operations of moving, rotating, scaling, flipping and deleting can be carried out, the whole or partial color of the prototype can be modified. The operation scene refers to scene mining and stacking, accompanied by sound effects. Electronic equipment will respond with the vibration effect. Specifically, when the operator performs mining operation at a certain position in the scene to a certain extent, water will appear in the scene until the mining reaches a certain degree, that is, the water reaches a certain depth. Then, the scene will not respond to the mining at this position. By stacking, the scene is such elevated as to achieve water filling and mountain stacking. The system will stop responding to the stacking operation after stacking to a certain height. All operations are controlled by the device switch. In terms of the form of representation, the handheld device can be transformed into hands or other auxiliary devices.

The objective environment in the operating space allows changing the form of representation of the space environment in the scene.

Interface operation allows controlling the switches of music, sound effect, vibration and communication windows, and viewing the prompt help interface or jumping to the main interface.

Communication: In the group scene case, the communication window is opened to allow all operators to communicate at the same time, or the organizer to communicate with one operator privately. The interface in the scene case of the organizer is a chat interface with a total number of operators +1, which includes a separate interface for communication with each operator in addition to a common window for communication with all operators. In a group scene case, the organizer can actively communicate with the operator in text, voice and video.

EXAMPLE 2

As shown in FIG. 1 to FIG. 3, a cognitive assessment system comprises:

a network platform environment built for an object under test to complete the self-cognitive assessment required for the financial risk control services in the network platform environment; wherein the object under test comprises one or more of individuals, collectives and organizations;

the self-cognitive assessment is applicable to corrective individuals and/or corrective collectives, and/or corrective organizations, and/or a low-risk group among those with poor credit reporting; the self-cognitive assessment involves judging the credit attitude and credit capacity of the object under test; and the network platform environment comprises a scene case built based on an augmented reality device and/or a virtual reality device.

This example is mainly originated from the dynamic "prototype image" created according to Carl Gustav Jung's "prototype" and the technical theory of analytical psychology. Different from traditional sand table model, it is the true representation of the innovation of relevant theories in psychology.

In the actual operation link of this example, the operator can determine the selection mode of current round according to the prompt description at the beginning of each round. The single-choice mode allows the operator to leave one prototype only in the scene in the current round, and the multi-choice mode means allows the operator to leave at least one prototype in the scene in the current round, but not more than the maximum number of prototypes in the prompt content.

Description of individual mode and group mode:

After opening the example of this embodiment, the operator first selects an organization mode. In the individual mode, the operator continues to select the scene mode and then enters the operation section. In the group mode, the identity of the operator will be changed to the organizer who will make relevant settings separately and select the scene mode. The settings can be changed at any time before entering the operation part. The organizer needs to select the application scene mode to be started, and the specific mode details will be updated irregularly by the backend server. Then, the organizer determines the invitees and the operation sequence; the number of invitees is not limited and the invitees can enter the operation part at any time during the invitation period; and the identity of the invitees is changed into the operator after entering the operation part.

The operator will operate according to the scheduled sequence after entering the operation part, and the system will give a prompt description at the beginning of each round of scenes, based on which each operator can create and edit one or more prototypes; and each operator leaves at least one prototype in each round of scenes.

In the individual mode, the next round will start when the previous operation comes to an end. In the group mode, current operator may end his current operation round through touch control, voice or gesture; after the previous operation comes to an end, the system will jump to the next operator in sequence and to the next round until the last operator ends his operation.

The number of rounds of operation is limited in the individual mode depending on the application scene, and the operation behavior data are submitted to the server side in the last round. There is no limit on the number of rounds in the group mode, and the final power to submit operational behavior data is controlled by the organizer.

The operation rules for prototype and scene are consistent in the individual mode and the group mode. Prototype: each operator can place, drag, zoom, rotate, flip, delete, discolor and colorize the prototype. Scene: each operator can change the weather, the meteorology and the theme color of a scene in a scene case; and the operator can zoom with the lens to observe and operate the local scene in close range in the stereo mode.

Description of plane mode and stereo mode:

The plane mode refers to a 2D scene and prototype, where the Cartesian coordinate system includes a rectangular coordinate system and an oblique coordinate system mainly represented by 2D picture, and the scene is divided into nine regions of the same or different sizes by default, i.e. house, or divided into nine regions (less than or more than nine regions) with different size and shape according to different application environments. The region attributes can be divided from the perspective of the whole front; specifically, the division from left to right indicates the transition from the past to the future, with the middle part being the present;

and the division from bottom to top indicates the transition from material/reality to ideal/spirit, with the middle part being the fusion/transition. The range of each area is determined according to the specific conditions of the actual application industry and the operator; and each part has both strict dividing lines and cross-domain (i.e. cross-house) parts at the junction. The cross-domain parts include the areas crossing two, three, four or even an unlimited number of regions. In statistical analysis, the cross-domain belongs to both independent domains and associated domains. The cross-house is particular and innovative, and the sound effect is mainly single channel, supplemented by multiple channels.

The stereo mode refers to a 3D scene and prototype. In the stereo mode, at least three axes can be selected; the three-dimensional coordinate system is used and three-dimensional picture is mainly displayed. By default, the scene is divided into twenty-seven regions of the same size or different sizes, i.e. house; or divided into less than twenty-seven or more than twenty-seven regions, with the size and shape of each region varying according to the actual application environment. The region attributes are divided as a whole when the scene is viewed from the top. Specifically, the division from left to right indicates the transition from the past to the future, with the middle part being the present; and the division from bottom to top indicates the transition from material/reality to ideal/spirit, with the middle part being the fusion/transition. The range of each area is determined according to the specific conditions of the actual application industry and the operator; and each area has both strict dividing lines and cross-domain (i.e. cross-house) parts at the junction. The cross-domain parts include the areas crossing two, three, four or even an unlimited number of regions. In statistical analysis, the cross-domain belongs to be both independent domains and associated domains. The cross-house is particular and innovative, and the sound effect is mainly multiple channels, supplemented by single channel.

There are weather changes in both plane mode and stereo mode.

Place: selecting a prototype from a prototype library and then placing the prototype into a scene case; drag: changing the coordinate position of the prototype with the moving finger or other operations capable of determining movement; zoom: operating a prototype according to the relative distance between two moving fingers or between the changes determined, and enlarging or reducing a prototype once or continuously according to a set proportion; rotate: determining the rotation axis according to the moving direction of fingers or other operations that can determine the direction, and rotating once or continuously according to the set angle value; flip: determining the direction of a prototype according to the moving direction of double fingers or other operations that can distinguish the rotation, determining the flipped axis according to the current prototype orientation and operation direction, and flipping the prototype; delete: the processing result after dragging a prototype outside the operation area of the scene.

Record and storage function: relevant and effective operation data can be recorded in this example. After the operator opens this example, all operations related to this application example of this embodiment will be recorded and stored; and all operation data in the operator's selection mode, organization mode and scene mode will be stored.

Recovery mode is a function particular to the organizer's account, through which the operator's operation record can be exported as a video, so as to consult and confirm the test and evaluation results in this example. After selecting the recovery function, the organizer will browse and archive the examples of this embodiment that he has organized, and can view the playback of specific examples.

Artificial intelligence: Different from other artificial intelligence technologies, it can cultivate learning through the simulation of the psychoanalytic psychology prototype as well as the projection mirror of cognitive behavior.

The artificial intelligence in this example is originated from Carl Gustav Jung's "prototype" and the technical theory of analytical psychology. The result and conclusion are obtained by analyzing the data information in the stored operator records.

The artificial intelligence of this example counts and parses the operator's operation records for prototypes (including the types, quantity, zoom state, rotation state, color change state, deletion times, position change, superposition sequence between prototypes and other relevant data information) as well as the distribution state of prototype in the scene. In addition to these data in static forms, the artificial intelligence will further calculate the implicit data of the operation time of each action, and analyze the final results in different forms according to different application environments, for example, scores, shapes or other forms that can comply with the application environment. The increased amount of data and increased complexity of data samples will further improve the artificial intelligence of this example.

The artificial intelligence in this example can analyze the operator's cognitive behavior and pre-judge subconscious cognitive behavior by sorting out the change of prototype in the house lattice, analyze the operator's self-cognition and cognitive understanding of other perceivable things by sorting out the selected different prototypes, analyze the operator's demand, habitual behavior and intention mode by sorting out the change of operation time, analyze the overall thinking logic and demand change and adaptation process of the operator by sorting out the overall operation trajectory of the operator, and analyze the change of the operator's cognitive behavior and demand process by sorting out the different positions of prototype in the three-dimensional space. In the iterative process of the above analysis, learning and summary, artificial intelligence can copy, simulate and improve the operator's behavior, so as to simulate his thinking model and cognitive behavior model, and achieve the effect of intelligent cultivation through continuous summary and improvement.

Operation time limit: Only in the group mode, the countdown will begin when the current operator is temporarily away, with the duration and countdown rules varying according to different application scenarios. If the current operator resumes operation before the countdown ends, the countdown will be canceled. If the current operator has not performed operation after the countdown ends, then the current operation of the current operator will be recorded as blank and will proceed to the next operator or the next step.

EXAMPLE 3

As shown in FIG. 1 to FIG. 3, a cognitive assessment system comprises:

a network platform environment built for an object under test to complete the self-cognitive assessment required for the financial risk control services in the network platform environment; wherein the object under test comprises one or more of individuals, collectives and organizations;

the self-cognitive assessment is applicable to corrective individuals and/or corrective collectives, and/or corrective organizations, and/or a low-risk group among those with poor credit reporting; the self-cognitive assessment involves judging the credit attitude and credit capacity of the object under test; and the network platform environment comprises a scene case built based on an augmented reality device and/or a virtual reality device.

The prototype of this example can be used for many times without upper limit, and multiple identical prototypes can be seen in the scene at the same time.

This example further comprises a signal acquisition device used to acquire bioelectric signals generated in transmitting information between neuron cells of an organism, detect and record various parts of the body.

The prototypes in this example have uniform and different types of representation styles and ratio standards, and can provide dynamic or static environments and prototypes, or a combination of them, and evaluate the real psychological state of the object under test in effective and more accurate way.

Different user interfaces and prototype styles can be customized according to different social periods and credit trends. The vibration effect, music and sound effects can be provided during operation. This example has dynamic switching function of day and night and weather, and different theme colors.

The example provides a multi-dimensional test assessment system capable of transplanting the traditional desktop and online assessment to electronic equipment, so as to perfectly solve the linear and planar state of the traditional assessment, and effectively solve the cognitive error of the reviewer due to the inevitable emotional and physical state.

The prototype of this example can be changed dynamically, and the text description of this example is also dynamic, which exactly corresponds to the question bank setting in traditional assessment.

In this example, prototypes are mapped to different meanings in a prototype library, and the quantified prototype library will gradually replace the role of actual reviewers under the continuous learning and iteration of artificial intelligence in a machine learning environment.

The interface, prototype and scene of this example can be continuously updated with the changes of public morals and fashions, and also be improved with the continuous accumulation of data.

The style and proportion of the prototype will be updated to meet the pattern of manifestation contained after the data are continuously accumulated, and the preparation for continuous updating of the prototype will further improve the data accumulation.

In the example of this embodiment, a conclusion is drawn by analyzing the collected data, which can be represented in different forms according to the scene settings or special needs, such as scores, feature descriptions, color marks and shape marks. In this example, the system for collecting and analyzing data and drawing conclusions based on artificial intelligence science can analyze the data, pictures and other information of the mobile phone in this example, and continuously improve and expand the analysis method and analysis mode of this example by adopting the method of machine learning.

The artificial intelligence in this example will sort out the cultivation mode of human behavior and character after continuous data accumulation and analysis, rather than simply perform deduction in script mode. The conclusion drawn by artificial intelligence will be closer to the truth with more and more perfect data support.

In this example, the real psychological attitude of operators (involving the credit attitude of individuals, organizations and collectives) in the financial industry can be tested and assessed.

In this example, the operation data of typical members in different groups can be collected in the social field to analyze and obtain self-cognition models of different groups.

The example is widely applied to the education field, and can test and evaluate the real self-cognition of individual students, classes, grades, schools, and schools at all levels. In addition, it can effectively and timely test and assess the changes of individual and collective self-cognition. As the education field is being under the influence of the changes of the times and public morals, the example can draw accurate conclusions on relevant details of changes, provide help for psychological research in the education field, and draw effective and timely test and assessment conclusions for the overall development of the education field in the future.

This example can effectively test and assess the self-cognition about personal work in the career self-evaluation, and dynamically make corresponding tests and assessments according to the changes of the times, public morals, age and industry.

The analysis part of this example is based on artificial intelligence technology to continuously improve the processing ability of learning itself and continuously improve the quantitative model of analysis psychology data, so as to make more realistic final conclusion and result.

Individual operation and group operation are no longer restricted by the organizer's physical strength, energy and organizing capacity. As a result, users can immerse themselves more deeply in the operation of the example of this embodiment, so as to more conveniently observe and feel the environment and prototype from an all-round angle. In a virtual environment, users can get rid of physical rules in the real world under specific circumstances, and can effectively operate scenes and prototypes in all directions. The data statistics on the test and assessment conducted by the organizer in the real scene are converted into the system to carry out digital processing on the data information operated by the example of this embodiment.

Traditionally, the career of natural persons, collectives and organizations is usually assessed according to the actual experience and some known industry trends. However, as career data and information cannot be quantified and summarized through a large number of tests and the real feelings of career-related people, it is impossible to give a complete career recommendation and career assessment.

In terms of career assessment, relevant data information are quantified through the test and acquisition of data on different employees in various industries, including those who are about to enter the industry, those who are newly entering the industry, those who have had several years of experience, those who are about to change careers, those who have changed careers and those who have retired, so as to understand a dynamic occupational group with a complete historical development track of the industry, compare the dynamic relationship between natural persons and the industry, and give more accurate and timely test assessment results about other personnel who are choosing careers, changing careers or have been working.

In the scene case, the organizer and the operator are in operation state and view state.

After everyone enters the scene, the operations are relevant to hands, fingers and gestures or the controller.

Required support software is as follows:

The function development tools for AR clients comprises ARPA, ARLab, DroidAR, Metaio, Wikitude and vuforia; and development platform such as Android, IOS, GoogleGlass, WindowsPC, Unity, EpsonMoverio BT-2000, Vuzix M-100, Optinvent OPA1, PhoneGap, Titanium and Xamarin.

The function development tools for VR clients comprises HoloLens Emulator, Google VR SDK, Google VR View, Web VR, Cardboard SDK, Faceshift Studio, A-Frame, Oculus DK2, Cryengine, Destinations Workshop Tools, RealSense SDK, Leap Motion SDK, kinect SDK, Source Engine, OpenVR SDK, Oculus SDK, Gear VR, Nibiru VR SDK; and development platform such as Android, IOS, GoogleGlass, WindowsPC, Unity, EpsonMoverio BT-2000, Vuzix M-100, Optinvent OPA1, PhoneGap, Titanium, Xamarin, Auto Stingray3D, Gamebryo, Virtools.

The artificial intelligence development tool comprises Python, C++, Java, Lisp, Prolog, R,SQL, Matlab, STYLE2PAINT, SerpenAI, Synaptic.js, Snake-AI, Uncaptcha, Sockeye, PHP-ML, CycleGAN, DeepLearn.js, TensorFire.

The remaining technical features in this example can be flexibly selected by those skilled in the art according to actual conditions, so as to meet different specific actual requirements. However, it will be apparent to those of ordinary skill in the art that the invention may not necessarily be realized with these specific details. In other examples, in order to avoid confusing the invention, well-known algorithms, methods or systems are not specifically described and are within the technical protection scope defined by the technical scheme as claimed in the claims of the invention.

For the sake of simple description, the aforementioned method embodiments are all expressed as a series of action combinations, but those skilled in the art should know that the application is not limited by the described action sequence, for the reason that some steps can be performed in other sequences or simultaneously according to the application. Next, those skilled in the art should also know that the embodiments described in the specification are all preferred embodiments, and the actions and units involved are not necessarily required by the application.

Those skilled in the art will recognize that the elements and algorithm steps of the examples described in connection with the embodiments disclosed herein can be implemented in electronic hardware, or a combination of computer software and electronic hardware. Whether these functions are implemented by hardware or software depends on the specific application and design constraints of the technical scheme. Skilled artisans may implement the described functions for each particular application according to different methods, but such implementation should not exceed the scope of the invention.

The disclosed systems, modules and methods may be implemented in other ways. For example, the device embodiments described above are only exemplary; the division of said units may be only a logic function division, and there may be other division modes in actual implementation; multiple units or components may be combined or integrated into another system, or some features may be ignored or not executed. Besides, the mutual coupling or direct coupling or communication connection shown or discussed can be said to be indirect coupling or communication connection through some interfaces, devices or units, which can be in electrical, mechanical or other forms.

The units described by the discrete components may or may not be physically separated, and the components displayed as units may or may not be physical units, that is, they may be located in one place, or they may be distributed over multiple network units. Some or all of the units can be selected according to actual needs to achieve the purpose of the scheme of this example.

The functions may be stored in a computer readable storage medium if they are implemented in the form of software function units and sold or used as independent products. Based on this understanding, the technical scheme of the invention, or essentially the part that contributes to the prior art or part of the technical scheme, can be embodied in the form of a software product, which is stored in a storage medium and includes several instructions to allow a computer device (a personal computer, a server, or other electronic devices such as network devices) to perform all or part of the steps of the method described in various embodiments of the invention. The aforementioned storage media include U disk, removable hard disk drive, Read-Only Memory (ROM), Random Access Memory (RAM), magnetic disk or optical disk and other media that can store program codes.

It should be understood by those of ordinary skill in the art that all or part of the process in the method for implementing the above embodiments can be completed by instructing relevant hardware through a computer program, which can be stored in a computer readable storage medium and can include the flow of the above embodiments when executed; wherein said storage medium may be magnetic disk, optical disk, ROM, RAM, etc.

The above description is only a preferred embodiment of the invention, and it should be understood that the invention is not limited to the form disclosed herein, and should not be regarded as an exclusion of other embodiments, but can be used in various other combinations, modifications and environments, and can be modified within the scope of the concepts described herein through the above teachings or techniques or knowledge in related fields. Moreover, modifications and changes made by those skilled in the art without departing from the spirit and scope of the invention shall fall within the protection scope of the appended claims.

What is claimed is:

1. A cognitive assessment system, comprising:
a network platform environment built for an object under test to complete the self-cognitive assessment required for the risk control services in the network platform environment; the object under test comprises one or more of individuals, collectives and organizations;
the self-cognitive assessment is applicable to corrective individuals and/or corrective collectives, and/or corrective organizations, and/or a low-risk group among those with poor credit reporting; and the network platform environment comprises a scene case built based on an augmented reality device and/or a virtual reality device;
wherein the cognitive assessment system further comprises an assessment terminal, the assessment terminal comprises a controller, an image acquisition module and a display module; the image acquisition module acquires and transmits real scene data to the controller for digital processing and constructing a scene case; the display module presents the scene case to interact the digitalized data with the networking device through a networking mode; and the display module comprises a virtual reality device and/or an augmented reality device;

an assessment module, comprising:
  logging a main interface of the assessment module, the people involved in a assessment is given two identities for operating the scene case: an organizer and an operator;
  two states are given for the organizer and the operator in the scene case; the two states comprise an operation state and a view state; and people involved in a assessment process interact with the controller through hands, fingers, and gestures or operate the controller after entering a scene case;
  the people involved in a assessment select an application scene mode to be started, comprising a plane mode and a stereo mode;
  after entering the operation part, the operator can create and edit one or more prototypes; the prototype comprises model, graph, picture and cognitive behavior generated by the operator; and
  an output module used for outputting the self-cognitive model of the object under test to a risk control service system, wherein a presentation mode of the self-cognitive model comprises one or more of numbers, feature descriptions, color marks, and shape marks.

2. The cognitive assessment system according to claim 1, comprising an artificial intelligence module, wherein the artificial intelligence module is used for mapping a prototype to a prototype library so that a quantified prototype maintain continuous learning and iteration under the learning environment of an artificial intelligence machine, copying, imitating and improving the behavior of an operator through artificial intelligence, and simulating the thinking model and cognitive behavior model of an operator, thereby replacing actual reviewers with artificial intelligence.

3. The cognitive assessment system according to claim 1, wherein the prototype comprises one or more of human beings, animals, plants, buildings, furniture and daily supplies, transportation, food, stones and shells, natural substances and meteorology.

4. The cognitive assessment system according to claim 1, wherein each operator can place, drag, zoom, rotate, flip, delete, discolor and colorize the prototype; and the operation rules for prototype and scene are consistent in the individual mode and the group mode;
  the operator can place the prototype, which refers to select a prototype from a prototype library and then placing the prototype into a scene case;
  the operator can drag the prototype, which refers to change the coordinate position of the prototype with the moving finger or other operations capable of determining movement;
  the operator can zoom the prototype, which refers to operate a prototype according to the relative distance between two moving fingers or between the changes determined, and enlarging or reducing a prototype once or continuously according to a set proportion;
  the operator can rotate the prototype, which refers to determine the rotation axis according to the moving direction of fingers or other operations that can determine the direction, and rotating once or continuously according to the set angle value;
  the operator can flip the prototype, which refers to determine the direction of a prototype according to the moving direction of double fingers or other operations that can distinguish the rotation, determining the flipped axis according to the current prototype orientation and operation direction, and flipping the prototype;
  the operator can delete the prototype, which refers to the process result after dragging a prototype outside the operation area of the scene.

5. The cognitive assessment system according to claim 1, wherein each operator can change the weather, the meteorology and the theme color of a scene in a scene case; and the operator can zoom with the lens to observe and operate the local scene in close range in the stereo mode.

6. The cognitive assessment system according to claim 1, wherein the number of rounds of operation is limited in the individual mode, and the operation behavior data are submitted to the server side in the last round; there is no limit on the number of rounds in the group mode, and the final power to submit operational behavior data is controlled by the organizer.

7. The cognitive assessment system according to claim 1, wherein the scene case comprises a virtual reality scene case and/or an augmented reality scene case; if a real test room is used as a template for production in the virtual reality environment, scenes, prototype libraries, prototypes and articles required for real scenes are arranged in the scene room in the virtual reality environment, and the image effects of other operators are also arranged for the group scene case; and a production site shall be a site of current organizer in an augmented reality environment,.

8. The cognitive assessment system according to claim 1, wherein the controller of the assessment terminal comprises a processor (3), the image acquisition module of the assessment terminal comprises a camera (9), and the display module of the assessment terminal comprises a display screen (4);
  the camera (9) captures an imaging in the field of view to acquire and transmit the real scene data to the processor (3) for digital processing and constructing a scene case, and presents the scene case on the display screen (4) to interact the digitalized data with the networking device in a networking mode; and the display screen (4) comprises a virtual display device screen and/or an augmented reality device display screen;
  the assessment terminal further comprises a bone conduction headphone (1), a microphone (2), power source (5), a brain wave collector (6), a scene switch (7) and a catcher (8); wherein the bone conduction headphone (1) transmits sound to a user; the power source (5) supplies electricity; the microphone (2) interacts the voice data; the display screen (4) displays the images seen by users in an augmented reality scene and/or a virtual reality scene; the brain wave collector (6) reads the user brain wave data; the scene switch (7) controls the switching between the virtual reality scene and the augmented reality scene; and the catcher (8) captures the body movements of users in the augmented reality scene and/or the virtual reality scene.

9. The cognitive assessment system according to claim 8, wherein the system can interact with the operation of the controller through the voice control signal of the microphone (2) and/or the mind control signal of the brain wave collector (6) after all people getting involved in the assessment process enter the same scene case, record and upload the operation behavior, feedback and interaction data to the server side where a self-cognitive model will be generated;
  wherein the assessment terminal comprises a BLUETOOTH module (23) used for data communication with the server and interacting with other users at the same time; a wireless communication module (22) used for data communication with the server and interacting with other users at the same time; a cable interface (32)

used for data communication with the server and interacting with other users at the same time; a USB interface (31) for storing data generated by the current user; a gyroscope (24) for collecting azimuth data; and a positioning module (21) for Beidou positioning, GPS positioning, GLONASS positioning or Galileo satellite navigation system positioning.

10. The cognitive assessment system according to claim 2, wherein the controller of the assessment terminal comprises a processor (3), the image acquisition module of the assessment terminal comprises a camera (9), and the display module of the assessment terminal comprises a display screen (4);
   the camera (9) captures an imaging in the field of view to acquire and transmit the real scene data to the processor (3) for digital processing and constructing a scene case, and presents the scene case on the display screen (4) to interact the digitalized data with the networking device in a networking mode; and the display screen (4) comprises a virtual display device screen and/or an augmented reality device display screen;
   the assessment terminal further comprises a bone conduction headphone (1), a microphone (2), power source (5), a brain wave collector (6), a scene switch (7) and a catcher (8); wherein the bone conduction headphone (1) transmits sound to a user;
   the power source (5) supplies electricity; the microphone (2) interacts the voice data;
   the display screen (4) displays the images seen by users in an augmented reality scene and/or a virtual reality scene; the brain wave collector (6) reads the user brain wave data; the scene switch (7) controls the switching between the virtual reality scene and the augmented reality scene; and the catcher (8) captures the body movements of users in the augmented reality scene and/or the virtual reality scene.

11. The cognitive assessment system according to claim 4, wherein the controller of the assessment terminal comprises a processor (3), the image acquisition module of the assessment terminal comprises a camera (9), and the display module of the assessment terminal comprises a display screen (4);
   the camera (9) captures an imaging in the field of view to acquire and transmit the real scene data to the processor (3) for digital processing and constructing a scene case, and presents the scene case on the display screen (4) to interact the digitalized data with the networking device in a networking mode; and the display screen (4) comprises a virtual display device screen and/or an augmented reality device display screen;
   the assessment terminal further comprises a bone conduction headphone (1), a microphone (2), power source (5), a brain wave collector (6), a scene switch (7) and a catcher (8); wherein the bone conduction headphone (1) transmits sound to a user; the power source (5) supplies electricity; the microphone (2) interacts the voice data; the display screen (4) displays the images seen by users in an augmented reality scene and/or a virtual reality scene; the brain wave collector (6) reads the user brain wave data; the scene switch (7) controls the switching between the virtual reality scene and the augmented reality scene; and the catcher (8) captures the body movements of users in the augmented reality scene and/or the virtual reality scene.

12. The cognitive assessment system according to claim 6, wherein the controller of the assessment terminal comprises a processor (3), the image acquisition module of the assessment terminal comprises a camera (9), and the display module of the assessment terminal comprises a display screen (4);
   the camera (9) captures an imaging in the field of view to acquire and transmit the real scene data to the processor (3) for digital processing and constructing a scene case, and presents the scene case on the display screen (4) to interact the digitalized data with the networking device in a networking mode; and the display screen (4) comprises a virtual display device screen and/or an augmented reality device display screen;
   the assessment terminal further comprises a bone conduction headphone (1), a microphone (2), power source (5), a brain wave collector (6), a scene switch (7) and a catcher (8); wherein the bone conduction headphone (1) transmits sound to a user; the power source (5) supplies electricity; the microphone (2) interacts the voice data; the display screen (4) displays the images seen by users in an augmented reality scene and/or a virtual reality scene; the brain wave collector (6) reads the user brain wave data; the scene switch (7) controls the switching between the virtual reality scene and the augmented reality scene; and the catcher (8) captures the body movements of users in the augmented reality scene and/or the virtual reality scene.

13. The cognitive assessment system according to claim 7, wherein the controller of the assessment terminal comprises a processor (3), the image acquisition module of the assessment terminal comprises a camera (9), and the display module of the assessment terminal comprises a display screen (4);
   the camera (9) captures an imaging in the field of view to acquire and transmit the real scene data to the processor (3) for digital processing and constructing a scene case, and presents the scene case on the display screen (4) to interact the digitalized data with the networking device in a networking mode; and the display screen (4) comprises a virtual display device screen and/or an augmented reality device display screen;
   the assessment terminal further comprises a bone conduction headphone (1), a microphone (2), power source (5), a brain wave collector (6), a scene switch (7) and a catcher (8); wherein the bone conduction headphone (1) transmits sound to a user;
   the power source (5) supplies electricity; the microphone (2) interacts the voice data;
   the display screen (4) displays the images seen by users in an augmented reality scene and/or a virtual reality scene; the brain wave collector (6) reads the user brain wave data; the scene switch (7) controls the switching between the virtual reality scene and the augmented reality scene; and the catcher (8) captures the body movements of users in the augmented reality scene and/or the virtual reality scene.

14. The cognitive assessment system according to claim 10, wherein the system can interact with the operation of the controller through the voice control signal of the microphone (2) and/or the mind control signal of the brain wave collector (6) after all people getting involved in the assessment process enter the same scene case, record and upload the operation behavior, feedback and interaction data to the server side where a self-cognitive model will be generated;
   wherein the assessment terminal comprises a bluetooth module (23) used for data communication with the server and interacting with other users at the same time; a wireless communication module (22) used for data communication with the server and interacting with other users at the same time; a cable interface (32) used for data communication with the server and interacting with other users at the same time; a USB interface (31) for storing data generated by the current user; a gyroscope (24) for collecting azimuth data; and a positioning module (21) for Beidou positioning or GPS positioning, GLONASS positioning or Galileo satellite navigation system positioning.

15. The cognitive assessment system according to claim 11, wherein the system can interact with the operation of the controller through the voice control signal of the microphone (2) and/or the mind control signal of the brain wave collector (6) after all people getting involved in the assessment process enter the same scene case, record and upload the operation behavior, feedback and interaction data to the server side where a self-cognitive model will be generated;
wherein the assessment terminal comprises a bluetooth module (23) used for data communication with the server and interacting with other users at the same time; a wireless communication module (22) used for data communication with the server and interacting with other users at the same time; a cable interface (32) used for data communication with the server and interacting with other users at the same time; a USB interface (31) for storing data generated by the current user; a gyroscope (24) for collecting azimuth data; and a positioning module (21) for Beidou positioning or GPS positioning, GLONASS positioning or Galileo satellite navigation system positioning.

16. The cognitive assessment system according to claim 12, wherein the system can interact with the operation of the controller through the voice control signal of the microphone (2) and/or the mind control signal of the brain wave collector (6) after all people getting involved in the assessment process enter the same scene case, record and upload the operation behavior, feedback and interaction data to the server side where a self-cognitive model will be generated;
wherein the assessment terminal comprises a bluetooth module (23) used for data communication with the server and interacting with other users at the same time; a wireless communication module (22) used for data communication with the server and interacting with other users at the same time; a cable interface (32) used for data communication with the server and interacting with other users at the same time; a USB interface (31) for storing data generated by the current user; a gyroscope (24) for collecting azimuth data; and a positioning module (21) for Beidou positioning or GPS positioning, GLONASS positioning or Galileo satellite navigation system positioning.

17. The cognitive assessment system according to claim 13, wherein the system can interact with the operation of the controller through the voice control signal of the microphone (2) and/or the mind control signal of the brain wave collector (6) after all people getting involved in the assessment process enter the same scene case, record and upload the operation behavior, feedback and interaction data to the server side where a self-cognitive model will be generated;
wherein the assessment terminal comprises a bluetooth module (23) used for data communication with the server and interacting with other users at the same time; a wireless communication module (22) used for data communication with the server and interacting with other users at the same time; a cable interface (32) used for data communication with the server and interacting with other users at the same time; a USB interface (31) for storing data generated by the current user; a gyroscope (24) for collecting azimuth data; and a positioning module (21) for Beidou positioning or GPS positioning, GLONASS positioning or Galileo satellite navigation system positioning.

18. The cognitive assessment system according to claim 1, wherein the operator selects an organization mode comprising an individual mode and a group mode; in the individual mode, the operator continues to select the scene mode and then enters an operation part; in the group mode, the identity of the operator is changed to the organizer who will select the scene mode and then enter the operation part.

19. The cognitive assessment system according to claim 6, wherein each operator leaves at least one prototype in each round of scenes; the operator determines the selection mode of current round according to the prompt description at the beginning of each round; wherein the single-choice mode allows the operator to leave one prototype only in the scene in the current round, and the multi-choice mode allows the operator to leave at least one prototype in the scene in the current round, but not more than the maximum number of prototypes in the prompt content.

20. The cognitive assessment system according to claim 1, wherein in the individual mode, the next round will start when the previous operation comes to an end; whereas, in the group mode, current operator may end his current operation round through touch control, voice or gesture; after the previous operation comes to an end, the system will jump to the next operator in sequence and to the next round until the last operator ends his operation; the operation behavior, feedback and interaction data of the operator will be recorded and uploaded to the server where a self-cognitive model will be generated.

21. The cognitive assessment system according to claim 1, wherein the self-cognitive assessment comprises judging the credit attitude and credit capacity of the object under test.

* * * * *